(12) United States Patent
Ruedin et al.

(10) Patent No.: US 6,587,175 B1
(45) Date of Patent: Jul. 1, 2003

(54) ELECTROOPTICAL CELL OR PHOTOVOLTAIC CELL, AND METHOD FOR MAKING SAME

(75) Inventors: Yves Ruedin, Saint-Blaise (CH); Michel Sallin, Saint-Blaise (CH); Jean-Jacques Born, Morges (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/622,024

(22) PCT Filed: Feb. 10, 1999

(86) PCT No.: PCT/EP99/00874
  § 371 (c)(1),
  (2), (4) Date: Aug. 11, 2000

(87) PCT Pub. No.: WO99/41638
  PCT Pub. Date: Aug. 19, 1999

(30) Foreign Application Priority Data

Feb. 11, 1998 (CH) .................................................. 0342/98
Feb. 13, 1998 (EP) ............................................... 98102530

(51) Int. Cl.⁷ ............................................. G02F 1/1336
(52) U.S. Cl. ......................... 349/149; 349/150; 349/152
(58) Field of Search .................................. 349/149, 150, 349/151, 152

(56) References Cited

U.S. PATENT DOCUMENTS 5,235,451 A  *  8/1993  Bryan .......................... 349/149
5,875,011 A  *  2/1999  Pierson et al. ............... 349/149

FOREIGN PATENT DOCUMENTS

EP           359 082           3/1990

* cited by examiner

Primary Examiner—James Dudek

(57) ABSTRACT

The invention concerns an electro-optical cell, in particular a liquid crystal cell, or an improved electrochemical photovoltaic cell including a contact pad (26) made of an electrically conductive material affixed onto each electrode (6, 8) of the cell, to the right of the lateral electric contact zone (22) where the electrode (6, 8) comes level with the edge of the strip (2, 4) onto which it has been deposited, so as to fill the volume of the cavity defined by each electrode (6, 8) with the respective strip (4, 2) which is opposite thereto, in order to increase the surface of the electric contact zone (22).

11 Claims, 3 Drawing Sheets

ELECTROOPTICAL CELL OR PHOTOVOLTAIC CELL, AND METHOD FOR MAKING SAME

BACKGROUND OF THE INVENTION

The present invention concerns an electro-optical cell, in particular a liquid crystal cell, or an improved electrochemical photovoltaic cell, in particular for a timepiece, and more particularly connecting means intended to establish an electric connection between the electrodes of the cell and an electric supply or control circuit. The present invention also concerns a manufacturing method for the aforementioned cell.

A first known category of photovoltaic cells converts light into electricity by exploiting the photovoltaic effect which appears at the junction of semi-conductors. The semi-conductor material fulfils at the same time the functions of light absorption and separation of the resulting electric charges (electrons and holes). As the material must have a high level of purity and be free of defects, failing which the electrons and holes would be combined again before having been able to be separated, the manufacturing costs are high.

The present invention is intended for a second type of photovoltaic cell called an electrochemical cell, a schematic diagram of which is shown in FIG. 1 annexed to this application.

Such a cell, designated as a whole by the general numerical reference 1, includes a first transparent front strip 2 and a second rear strip 4 which is also transparent. These two strips 2 and 4 each include, on their facing faces, a first electrode 6 also called a counter-electrode, and a second electrode 8 also called a photoelectrode. These electrodes 6 and 8 are usually made in the form of a thin layer of an indium/tin or tin oxide/antimony mixture.

Strip 4 further includes a layer 10 made in the form of a porous structure 12 having a large effective surface formed of particles of an active semi-conductor oxide such as, for example, titanium dioxide $TiO_2$, the role of which will be described hereinafter.

Strips 2 and 4 are joined to each other by a sealing frame 14 which extends along, the perimeter thereof and which defines a volume 16 filled with an electrolyte 18 containing a mediator such as the redox couple iodide-tri-iodide $I^-/I^{3-}$.

Titanium oxide $TiO_2$ which constitutes layer 10 is a semi-conductor which is normally not sensitive to visible light because of the width of its forbidden band, and which only begins to absorb close to ultraviolet. It can nonetheless be sensitised by adsorption of a colouring agent such as a complex compound of a transition metal, in particular ruthenium or osmium, which allows an incident photon/electron conversion rate approaching the unit. The light absorption, symbolised by arrows in FIG. 1, is assured by the colouring agent chemically adsorbed at the surface of semi-conductive material layer 10. After having been excited by the absorption of a light photon, the colouring agent can transfer an electron into the conduction band of the semi-conductor of layer 10. The electric field present within the semi-conductive layer 10 allows the extraction of this electron. After transferring the electron, the colouring agent returns to the fundamental oxidised state. The recombination between the electron in the conduction band and the hole on the oxidised colouring agent is much slower than the reduction of the oxidised colouring agent by the mediator. Consequently, the charge separation is efficient. The oxidised mediator is reduced to counter-electrode 6.

The present invention is also intended for so-called electro-optical display cells, in particular liquid crystal cells which, like electrochemical photovoltaic cells, include.

- a first transparent front strip whose upper surface constitutes the front face of said cell;
- a second rear strip whose lower surface constitutes the rear face of said cell;
- each of the strips including on their facing faces at least one electrode, these electrodes being intended to be connected to a display control circuit and partially coming level with the edge of the corresponding strip to define an electric contact zone in distinct locations on the cell perimeter;
- the strips being separated by a sealing frame defining a volume for the confinement of an optically active medium, and
- connecting means for establishing the electric connection between each electrode and said display control circuit.

A constant problem in the field of electrochemical cells of the kind described hereinbefore lies in the connecting means to be used for establishing a reliable electric contact between the electrodes of the cell and an electric supply circuit. This problem is also encountered with electro-optical display cells wherein the electrodes of the cell have to be connected to a device for generating electric control signals which modify the electro-optical characteristics of the material confined between the strips of the cell.

The Applicant has already provided a response to this problem by proposing, in his French Patent No. FR-B1-2 637 110, an improved electro-optical cell wherein each of the two cell strips carries a transparent electrode over its entire surface, this electrode partially coming level with the edge of the strip onto which it has been deposited to define a lateral electric contact zone. In this Patent, the connecting means include a contact pad made of an adhesive synthetic material charged with conductive particles which are added onto the edge of each strip, to the right of the contact zone, and which assure the electric connection with the electric control circuit of the cell.

During use, this connection technique has nonetheless exhibited several drawbacks. On the one hand, the strips of the cell must be staggered in relation to each other, in order to provide access to the electrodes and to make the electric connections. Such an arrangement makes series manufacturing of the cells difficult, in particular when the cells are circular, and requires additional time-consuming operations.

On the other hand, as recalled hereinbefore, the connection between the electrodes and the control circuit is made via the electric contact zone where each of the electrodes of the cell comes level with the edge of the strip onto which it has been deposited. The thickness of this contact zone is very small, typically of the order of a thousand angstroms. Problems of electric contact or even breakage of the mechanical connection between the electrodes and the contact pads thus appear.

Moreover, timepieces such as wristwatches are known wherein an electrochemical photovoltaic cell of the aforementioned type is conventionally arranged under the crystal so as to be sufficiently exposed to light. By conversion of the visible light into an electric current, the photovoltaic cell powers, via an electric circuit, the horometric means of the watch.

Arranged underneath the watch crystal, the photovoltaic cell covers the time indicators (minute and hour hands, etc.) as well as the dial of the watch. Nonetheless, since this cell is quasi transparent, the indicators and the dial remain visible through the cell.

The electric connections of an electrochemical cell, arranged in two distinct locations on the cell perimeter, must however be masked in order to made them invisible from the exterior when one looks through the watch crystal. In order to overcome this problem, the only known solution is to increase the size of the bezel to mask the electrodes, and thus to reduce the useful surface of the crystal and the dial, which is detrimental to the aesthetic appearance of the watch and to the ability to read the information displayed on the dial. Another solution consists in reducing the dimensions of the photovoltaic cell, which is detrimental to its efficiency.

Another solution is known from the unexamined Japanese Patent Application No. 61-201289 which concerns a liquid crystal cell including a first front transparent plate 1a, and a second back plate 1b which is also transparent. These two plates 1a and 1b each include on their opposite faces a set of electrodes, respectively 2a and 2b, said electrodes being flush with the edge of the plate on which they have been deposited to define electric contact zones. Spacers such as micro-balls or glass fibres are dispersed between the two plates 1a, 1b in order to keep the thickness of the liquid crystal layer uniform over the entire surface of the cell. A connector is made by means of a flexible insulating film 3a on which is printed an electrically conductive ink 4 having adhesive properties. Ink 4 is printed according to substantially rectilinear strips which have the same pitch as the transparent electrodes which are flush along the edges of the cell. Between the conductive strips, an insulating ink with adhesive properties is printed, so that the printed surface becomes plane. Connection film 3a is then secured via pressure against the edges of the cell to form the sealing thereof. During this operation, electrically conductive ink 4 infiltrates slightly between plates 1a, 1b of the cell, so that the electric connection is established between the electrodes of the cell and the conductive strips. After flexible connecting film 3a has been applied against the edges of the cell, liquid crystal 5 is injected in the gap between the two glass plates 1a and 1b, either through a filling opening formed in one of plates 1a or 1b, or at a location where flexible connecting film 3a has not yet been secured against the edge of the cell. Afterwards, the filling opening is sealed in order to obtain a liquid crystal cell with connecting film 3a secured against the edge of said cell.

The cell described above has the following drawbacks. It should be noted, on the one hand, that the conductive ink is directly in contact with the liquid crystals, thereby creating a non-negligible risk of contaminating said crystals and damaging the performance of the cell. On the other hand, such a method does not allow the cells to be manufactured in batches. Indeed, in the case of a conventional liquid crystal cell, the sealing frame allows the two substrates of the cell to be secured to each other, and the cell to be handled easily. In particular, the operation of filling the cells with the liquid crystal can be performed when the cells are still in a strip, i.e. not individually separated. However, in the case of the aforementioned Japanese Patent Application, the two plates which are not secured to each other have to be held in place with respect to each other until the connecting film has been secured to the edges of said Mates. Such an operation can thus only be performed individually on each part.

SUMMARY OF THE INVENTION

The present invention therefore concerns an electro-optical cell, in particular a liquid crystal cell, or an electrochemical photovoltaic cell including:

a first transparent front strip whose upper surface constitutes the front face of said cell;

a second strip which may or may not be transparent, and whose lower surface constitutes the rear face of said cell;

the strips each including, on their facing faces, at least one electrode, these electrodes being intended to be connected to an electric supply or control circuit and coming partially level with the edge of the corresponding strip to define a lateral electric contact zone in distinct locations on the cell periphery;

the strips being separated by a sealing frame defining a volume for the confinement of a photoelectrically or electrooptically active medium; and electric connecting means for establishing the electric connection between each electrode and said supply or control circuit, characterised in that the connecting means include a contact pad made of an electrically conductive material added onto each electrode in the lateral contact zone where the latter is level with the edge of the strip onto which it has been deposited, so as to fill the volume of the cavity defined by each electrode with the strip which is opposite thereto, in order to increase the surface of the lateral contact zone.

As a result of the features of the present invention, it is possible to increase the surface of the lateral electric contact zone via which each electrode of the cell is connected to the electric supply or control circuit. The electric connection between the electrodes and the electric supply or control circuit is thus much more reliable.

According to another advantageous feature of the invention, the electric connecting means of the photovoltaic or electrochemical cell include a contact part affixed to the right of the electric contact zone where each electrode comes level with the strip on which it has been deposited, this electric contact part realising the electric contact transfer on one of the front or back faces of the cell.

It is thus possible, for example, to make an electrochemical photovoltaic cell whose connecting means, which are intended to establish the electric connection between the cell electrodes and an electric supply circuit, are transferred on the back face of said cell. The cell sealing frame and the contact transfer on the back face of the latter are thus superposed rather than juxtaposed laterally as is the case in the prior art. The bezel of the timepiece or any other means intended to mask the sealing frame of the cell also masks the electric contact zones thereof. The dimensions of the crystal, and thus of the timepiece dial can be increased, which is advantageous as regards the aesthetic appearance of the watch and the ease with which the information on the dial thereof can be read. Likewise, the photovoltaic cell can be larger, which increases its efficiency. Finally, it is no longer necessary to stagger the strips of the cell. The space requirement of the cell is therefore reduced, which facilitates the mounting thereof in particular in a timepiece. The manufacture of such cells can also be performed in batches, allowing the cost price thereof to be reduced as a result of large scale manufacture.

According to another aspect, the present invention also concerns a manufacturing method for the aforementioned cell wherein, prior to separation of the cells, each of the cell electrodes is extended slightly beyond the final geometrical limit of said cell by means of a deposition of an electrically conductive material.

According to an aspect of the method of the invention, the lateral electric contact zones are metallised by vacuum evaporation or covered with a layer of an electrically conductive material at the locations where the electric contact parts will subsequently be applied.

Another object of the invention is to provide a timepiece including an electrochemical photovoltaic cell according to the invention intended to supply, via an electric supply circuit, in particular the horometric means of the timepiece and/or an electro-optical display cell for the presentation of information.

BRIEF DESCRIPTION OF THE DRAWINGS

Other features and advantages of the present invention will appear more clearly upon reading the following description of an embodiment of the invention, given purely by way of illustrative and non-limiting example, this description being made in conjunction with the annexed drawings, in which.

DETAILED DESCRIPTION OF THE INVENTION

It will be noted first of all that, although the present invention is described with reference to an electrochemical photovoltaic cell, it applies in an identical manner to electro-optical display cells of the type described hereinbefore.

Moreover, the number of electrodes of a cell according to the invention is not limited to two, and each of the strips of the cell could include a plurality of electrodes deposited selectively in accordance with a chosen configuration.

Figure 1:
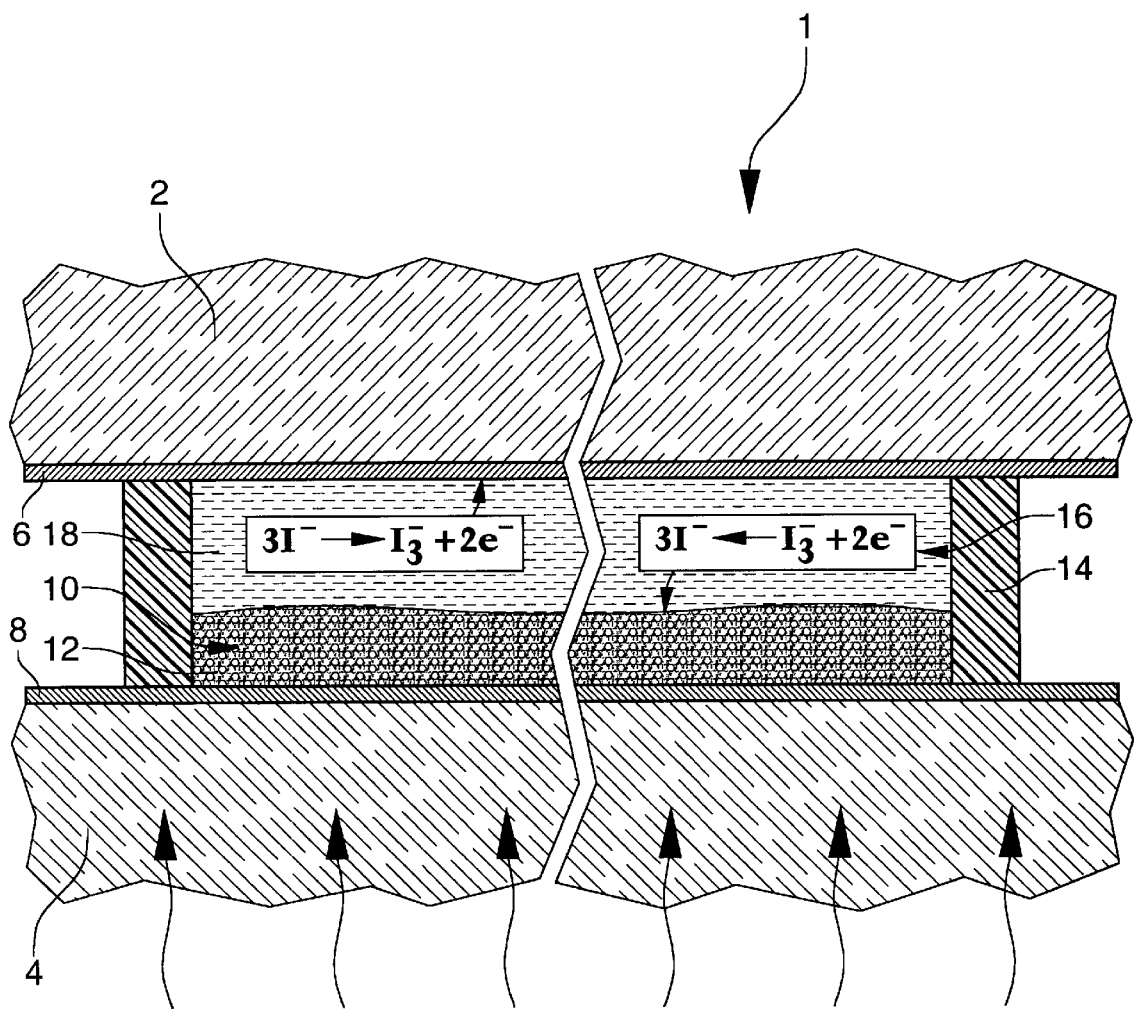
FIG. 1, which has already been cited, is a schematic transverse cross-section of a conventional electrochemical photovoltaic cell.
Figure 2:
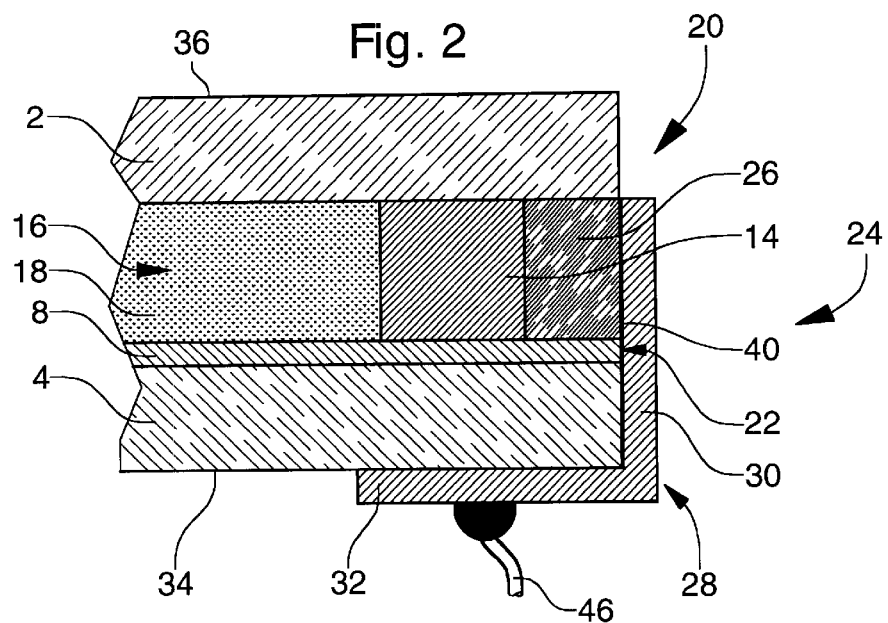
FIG. 2 is a transverse cross-section of an electrochemical photovoltaic cell according to the invention.

One refers now to FIG. 2, which is a larger scale transverse cross-section of an electrochemical photovoltaic cell according to the invention designated as a whole by the general numerical reference 20.

In the following description, those elements which are identical to those previously described will be designated by the same numerical references.

Cell 20 includes in a conventional manner a transparent first front strip 2 and a second back strip 4 which can also be transparent. Strips 2 and 4 are joined to each other by a sealing frame 14 which defines a volume 16 for the confinement of an electrolyte 18 containing a mediator such as the redox couple iodide-tri-iodide $I^{-/I3^{-1}}$. Strips 2 and 4 each include on their facing faces a first electrode 6 also called a counter-electrode, and a second electrode 8 also called a photo-electrode. Strip 4 also includes in a conventional manner a layer of semi-conductor material at the surface of which is adsorbed a colouring agent intended to sensitise said semi-conductor. These layers have not been shown in FIG. 2 for reasons of clarity.

The electric connection of photo-electrode 8 deposited on back strip 4 will be described hereinafter. It goes without saying that the present invention applies in an identical manner to counter-electrode 6 deposited on front strip 2.

Photo-electrode 8 comes partially level with the edge of strip 4 to define a lateral electric contact zone 22. According to the present invention, electric connecting means 24 for establishing the electric connection between photo-electrode 8 and an electric supply circuit (not shown) include an electric contact pad 26 affixed to the surface of photo-electrode 8, to the right of electric contact zone 22 where photo-electrode 8 comes level with the edge of strip 4 onto which it has been deposited. This electric contact pad 26 can be formed by a synthetic adhesive material such as epoxy adhesive charged with conductive particles. Electric contact pad 26, by filling the volume of the cavity defined by electrode 8 with front strip 2 which is opposite thereto, allows the surface of electric contact zone 22 to be substantially increased, so that the electric connection between photo-electrode 8 and the electric supply circuit is much more reliable and has a higher level of conductivity. Moreover, it is no longer necessary to stagger the two strips 2, 4 of cell 20, so that these strips 2, 4 can be identical, superposed and overlapping each other. One therefore achieves great manufacturing simplicity for such cells, in particular in the event that they are circular, and thus a considerable reduction in the cost price thereof. Moreover, the space requirement of the cells is reduced, which facilitates the mounting thereof, in particular in a timepiece.

In the event that the strips of a cell according to the invention each include a plurality of electrodes, the sealing frame can be extended, so that it forms, to the right of the electric contact zone where each electrode comes level with the edge of the strip onto which it has been deposited, vertical confining partitions to prevent the conductive adhesive extending laterally and causing a short-circuit with the neighbouring electrodes.

Figure 3:
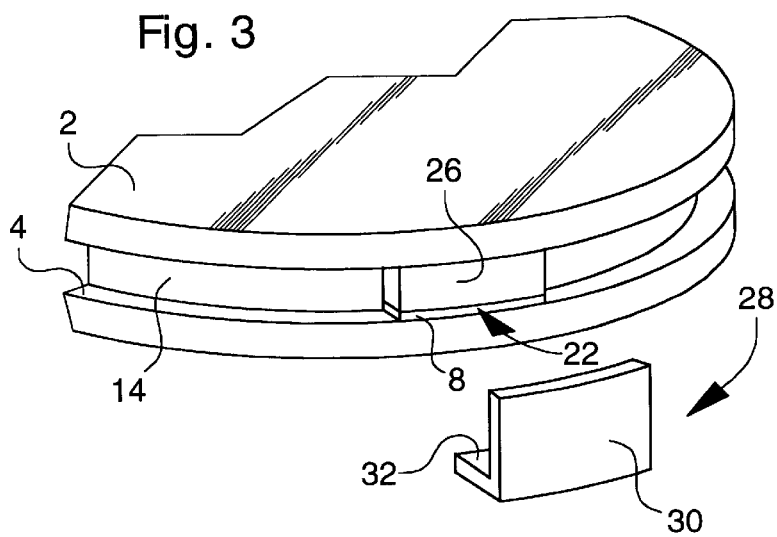
FIG. 3 is a perspective view of the electric contact part according to the invention.

According to another aspect of the invention, electric connecting means 24 are completed by an electric contact part 28 affixed onto the edge of strip 4, to the right of electric contact zone 22. This electric contact part 28 has the general shape of a square with two arms 30 and 32 arranged at right angles (see FIG. 3) which realise the electric contact transfer on lower surface 34 of strip 4 forming the back face of cell 20. Thus, as a result of the present invention, the electric connection of electrodes 6 and 8 is transferred on the back face of electrochemical cell 20 and is no longer formed on the side of the latter, which allows the lateral geometrical space requirement of said cell 20 to be substantially reduced. It goes without saying that the electric contact could be transferred in a similar manner on upper surface 36 of front strip 2 forming the front face of cell 20.

Figure 4:
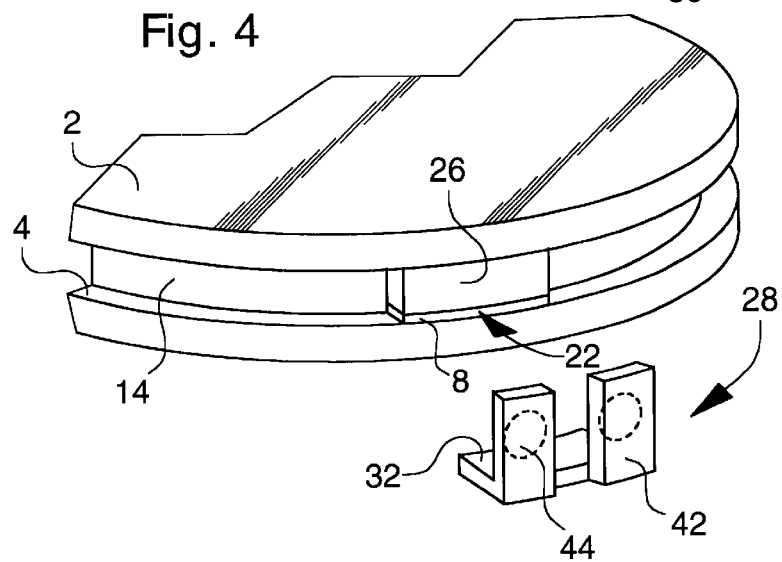
FIG. 4 is a perspective view of the electric contact part according to the invention.

Electric contact part 28 is made of metal or a metal alloy which conducts electricity and whose expansion coefficient will preferably be adapted to that of strips 2 and 4. It is joined to the edge of strip 4 by means of a layer 40 of epoxy adhesive charged with conductive particles of silver or suchlike. According to an alternative embodiment shown in FIG. 4, arm 30 of contact part 28 is replaced by tongues 42 onto each of which is deposited a dose of epoxy adhesive prior to mounting.

Electric contact part 28 can also be made in the form of a simple strip (not shown) which rests on the edge of strip 4, at lateral electric contact zone 22.

The end of an electric conductor 46 intended to connect photo-electrode 8 to the supply circuit is fixed onto arm 32 of electric contact part 28.

In a method which is currently used for manufacturing batches of electrochemical photovoltaic cells, two large plates of glass or synthetic material are prepared, at least one of these plates being transparent. The electrodes and conductive paths are then made on these plates, then a sealing material is deposited on one of the plates, said sealing material being intended to define with the latter a confinement volume for an electrolyte. The plates are assembled overlapping with each other to form an assembly including several rows of open cells. Since each cell has a filling opening, the cells are filled with the electrolyte, then said filling openings are hermetically sealed. If the contour of the cells has to be circular, the cells can be cut using a high pressure water jet, a laser beam or any other suitable means. A set of cells can also be divided into rectilinear strips by glass scoring and breakage techniques along parallel straight lines.

Figure 5:
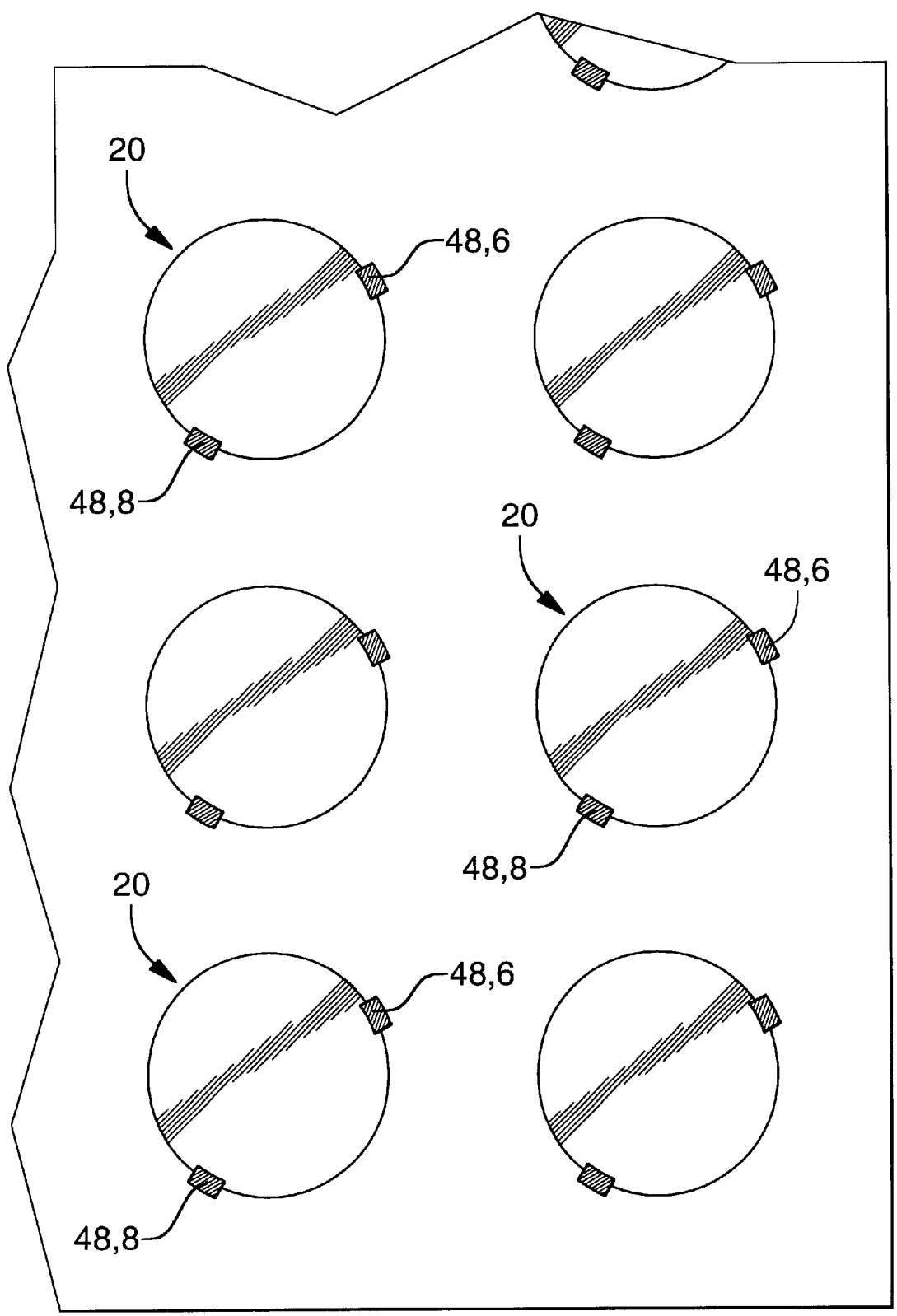
FIG. 5 is a top view of a batch of electrochemical photovoltaic cells prior to separation.

According to the method of the invention, and as is shown by FIG. 5, a manufacturing method for electrochemical photovoltaic cells 20 is proposed, wherein, prior to separating cells 20, each of electrodes 6, 8 of cell 20 is extended slightly beyond the final geometrical limit of said cell 20, by means of a deposition 48 of electrically conductive material such as epoxy adhesive charged with conductive particles. Cells 20 are then separated by the aforementioned techniques, and one obtains cells 20, which have electric contact pads 26, level with the edge of strips 2, 4 of said cell 20, and which allow the surface of lateral electric contact zone 22 between electrodes 6 and 8 of cell 20 and connection means 24 according to the invention to be increased.

As is also shown by FIG. 5, the lateral contact zones where each of the electrodes of the cell is level with the edge of the strip onto which it has been deposited are not superposed, but offset angularly along the perimeter of the cell, in order to avoid any risk of short-circuit between the electrodes.

According to another aspect of the manufacturing method of the invention, electric contact zone 22 is metallised by vacuum evaporation or covered with a layer of electrically conductive material such as epoxy adhesive charged with conductive particles. The state of the surface of contact zone 22 is thus excellent which allows intimate contact with contact part 28.

Another object of the present invention is to provide a timepiece including in a conventional manner a case sealed by a crystal and a back cover and using an electrochemical photovoltaic cell according to the invention as a source of energy, and/or an electro-optical display cell for the presentation of information. As will have been understood from the above, the electrochemical cell is capable of converting light into an electric current to supply in particular, via an electric supply circuit, the horometric means of the timepiece. The electrochemical cell according to the invention could in particular be arranged between the crystal and the dial of the timepiece, for example joined to the back face of the crystal by adhesive.

It goes without saying that various simple modifications and alternatives fall within the scope of the present invention.

What is claimed is:

1. Electro-optical cell, in particular a liquid crystal cell, or an improved electrochemical photovoltaic cell including:

a first transparent front strip (2) whose upper surface (36) constitutes the front face of said cell;

a second back strip (4) which may or may not be transparent, and whose lower surface (34) constitutes the back face of said cell;

the strips (2, 4) each including, on their facing faces, at least one electrode (6, 8), these electrodes (6, 8) being intended to be connected to an electric supply or control circuit and coming partially level with the edge of the strip (2, 4) onto which they have been deposited to define a lateral electric contact zone (22) in distinct locations on the cell periphery;

the strips (2, 4) being separated by a sealing frame (14) defining a volume (16) for the confinement of a photoelectrically or electrooptically active medium; and electric connecting means (24) for establishing the electric connection between each electrode (6, 8) and said supply or control circuit, characterised in that the connecting means (24) include a contact pad (26) made of an electrically conductive material added onto each electrode (6, 8) in the lateral electric contact zone (22) where the latter is level with the edge of the strip (2, 4) onto which it has been deposited, so as to fill the volume defined by the electrode (6, 8) onto which the contact pad (26) has been deposited, the strip respectively (4, 2) which is opposite to this electrode (6, 8), the sealing frame (14) and the edge of each strip (2, 4).

2. Cell according to claim 1, characterised in that the strips (2, 4) are identical, superposed and overlapping each other.

3. Cell according to claim 1, characterised in that the contact pad (26) is made of a synthetic adhesive material charged with conductive particles.

4. Cell according to claim 3, characterised in that the synthetic adhesive material charged with conductive particles is epoxy adhesive.

5. Cell according to claim 1, characterised in that the electric connecting means (24) further include a contact part (28) made of an electrically conductive material and affixed to the edge of each strip (2, 4), to the right of the lateral electric contact zone (22), the electric contact part (28) realising the electric contact transfer on one of the front or back faces (34, 36) of said cell (20).

6. Cell according to either of claims 5, characterised in that the contact part (28) has the shape of a square with two arms (30, 32) arranged at right angles.

7. Cell according to claim 6, characterised in that one of the arms (30, 32) of the contact part (28) is replaced by tongues (42).

8. Cell according to claim 6, characterised in that the expansion coefficient of the contact part (28) is adapted to that of the strips (2, 4).

9. Manufacturing method for an electro-optical cell, in particular a liquid crystal cell, or an improved electrochemical cell according to claim 1, characterised in that prior to the step of separating the cells (20), each of the electrodes (6, 8) of the cell (20) is extended slightly beyond the final geometrical limit of said cell (20) by means of a deposition (48) of electrically conductive material.

10. Method according to claim 9, characterised in that the lateral electric contact zones (22) are metallised by vacuum evaporation or covered with a layer of electrically conductive material.

11. Timepiece including a case sealed by a crystal and a back cover and in which a clockwork movement is housed, characterised in that it uses an electrochemical photovoltaic cell as a source of energy for the electric supply of the clockwork movement, and/or an electro-optical display cell for the presentation of information according to claims 1.

* * * * *